United States Patent [19]

Wolfer

[11] 4,168,656

[45] Sep. 25, 1979

[54] APPARATUS FOR IMPROVING COFFEE GROUNDS USAGE

[76] Inventor: Robert C. Wolfer, 1205 Grandview, Lockport, Ill. 60441

[21] Appl. No.: 830,167

[22] Filed: Sep. 2, 1977

[51] Int. Cl.² .............................................. A47J 31/10
[52] U.S. Cl. ........................................ 99/306; 99/311; 99/312
[58] Field of Search ................. 99/307, 308, 310, 311, 99/312, 313, 314, 315, 300, 295, 306, 299; 426/432

[56] References Cited

U.S. PATENT DOCUMENTS

| | | | |
|---|---|---|---|
| 1,550,336 | 8/1925 | Bingham | 99/310 |
| 1,778,792 | 10/1930 | Cameron | 99/306 |
| 2,001,160 | 5/1935 | Smith | 99/312 |
| 2,383,144 | 8/1945 | Moore | 99/285 |
| 3,309,980 | 3/1967 | Bozek | 99/295 |
| 3,353,475 | 11/1967 | Robbins | 99/312 |
| 3,361,052 | 1/1968 | Weber | 99/299 |
| 3,795,182 | 3/1974 | Damme | 99/306 |
| 3,878,772 | 4/1975 | Nordskog | 99/295 |
| 3,931,756 | 1/1976 | Brunt | 99/306 |
| 3,952,642 | 4/1976 | Vitous | 99/300 |

*Primary Examiner*—Robert W. Jenkins

*Attorney, Agent, or Firm*—Gary M. Ropski; Melvin F. Jager

[57] ABSTRACT

An apparatus and method for improving coffee grounds usage wherein a removable insert means is provided for confining coffee grounds within a substantially annular area of a coffee grounds receptacle. In an alternative embodiment, a coffee grounds receptacle for a coffee maker is provided, having an inner spacer means whereby coffee grounds are confined to an annular area between the inner spacer means and the outer wall of the receptacle. In each of the embodiments, the insert means or the coffee grounds receptacle is provided with an aperture means for accommodating a tube conveying rising hot liquid to an area above the coffee grounds, and further includes a plug for the aperture means so that the insert or coffee grounds receptacle is adapted to be used in a drip-type coffee maker. The apparatus and method of the invention permit making a number of cups of coffee in a coffee maker with fewer coffee grounds while at the same time maintaining flavor and desired strength of the coffee produced with the coffee grounds, by confining the coffee grounds within a substantially annular area whereby the depth of the coffee grounds is maintained at approximately a pre-selected level.

5 Claims, 4 Drawing Figures

APPARATUS FOR IMPROVING COFFEE GROUNDS USAGE

BACKGROUND OF THE INVENTION

The present invention involves apparatus and method for improving coffee grounds usage. The apparatus of the invention relate particularly to a coffee grounds receptacle and a removable insert, both of which confine coffee grounds within a substantially annular area to maintain the depth of the coffee grounds at a desirable level while using fewer coffee grounds to make a suitable number of cups of coffee. The apparatus can be used in various types of coffee makers.

Coffee is typically made in percolator or drip-type coffee makers. A coffee percolator is generally an apparatus in which boiling liquid, initially introduced as tap water, repeatedly rises through a tube and rebounds from a dome to be deflected downwardly through ground coffee beans located within a perforated receptacle or basket to extract their essence as liquid coffee. Percolators with electrically operated heating elements typically have a thermostatic control which terminates heating of the percolated coffee liquid after the liquid has reached a certain temperature. A drip-type coffee maker typically passes hot water through an amount of coffee grounds at a rate designed to produce coffee of desired strength without passing the water through the coffee grounds more than once.

In the prior art apparatus, supplemental small percolator baskets are provided to be inserted over the hot water tube of a primary coffee percolator basket when making a quantity of coffee which is less than the quantity produced when the primary basket is filled to capacity. According to the prior art, when such a supplemental basket is used, thereby reducing the total amount of coffee grounds which can be placed in the basket, a correspondingly reduced quantity of coffee liquid will be produced. In other words, when fewer coffee grounds are used, fewer cups of coffee are made.

Furthermore, a supplemental basket or strainer cup, such as disclosed in Cameron U.S. Pat. No. 1,778,792, typically confines the coffee grounds close to the centrally located hot water tube, i.e., within the zone in which the greatest quantity of liquid drippings descend from a percolator dome over the hot water tube. However, this supplemental cup must be designed to correspond to the liquid rebound characteristics of the dome of the particular coffee percolator in which it will be used. In other words, the diameter of the supplemental coffee grounds receptacle must be large enough to receive a substantial amount or a majority of the coffee liquid drippings from the percolator dome. Such a supplemental cup is of less utility in a coffee percolator whose dome distributes coffee liquid over a substantial cross-sectional area of the primary coffee grounds basket.

According to the present invention, an apparatus and method are provided which overcome the disadvantages of the prior art in accommodating an amount of coffee grounds less than the capacity of the primary coffee maker basket. The apparatus and method of the present invention advantageously reduce the amount of coffee grounds used to produce a desired quantity of coffee liquid. Furthermore, instead of confining the coffee grounds to an area near the center of a coffee receptacle or basket, the coffee grounds are confined to a substantially annular area near the outer wall of the receptacle. In one embodiment of the apparatus of the invention, there is provided a removable insert means for confining coffee grounds within a substantially annular area in a coffee grounds receptacle and for directing the liquid toward the annular area. In another embodiment of the invention, a coffee grounds receptacle is provided which includes an inner spacer means for confining the coffee grounds to an annular area and for directing liquid toward the annular area.

Particularly when used in a coffee percolator, having a coffee grounds receptacle and a tube positioned within the receptacle for conveying rising hot liquid to an area above the coffee grounds, the means for confining coffee grounds within the substantially annular area has a frustoconical upper surface provided with an aperture to accommodate the hot liquid tube so that liquid flowing from the tube is directed into the annular area. A plug is provided for the aperture so that the means for confining coffee grounds is adapted to be used in a drip-type coffee maker. According to the method of the invention, coffee grounds are confined within a substantially annular area of approximately the same depth as when the coffee grounds receptacle of the prior art is filled to a pre-selected level for making a quantity of coffee of a certain strength and flavor.

Accordingly, the apparatus of the present invention provide an inexpensive and effective means for improving coffee grounds usage by reducing the amount of coffee grounds used by confining coffee grounds within a volume which maintains the height of the coffee grounds at a pre-selected level even though a reduced amount of coffee grounds is used. In this manner, a quantity of coffee liquid can be brewed using fewer coffee grounds than in the prior art, while at the same time maintaining the desired strength and flavor of the coffee produced with this smaller amount of coffee grounds.

A further advantage of the present invention is that the apparatus directs liquid used in extracting the coffee essence from the beans into the reduced cross-sectional area in which the coffee grounds are confined. Because the liquid does not bypass the coffee grounds area, the desired amount of essence of coffee grounds can be removed during the time period allotted for percolation, either by external manual or internal thermostatic or automatic timing of the percolation process.

A still further advantage of the present invention is that the insert means can be used either with a percolator or a drip-type coffee maker, depending upon the choice of the user.

Other objects, features and advantages of the invention will become apparent upon reading the following detailed description in conjunction with the accompanying drawings, which are intended to show the features of the present invention, but are not necessarily drawn to scale.

DETAILED DESCRIPTION OF THE PREFERRED EMBODIMENTS

Figure 1:
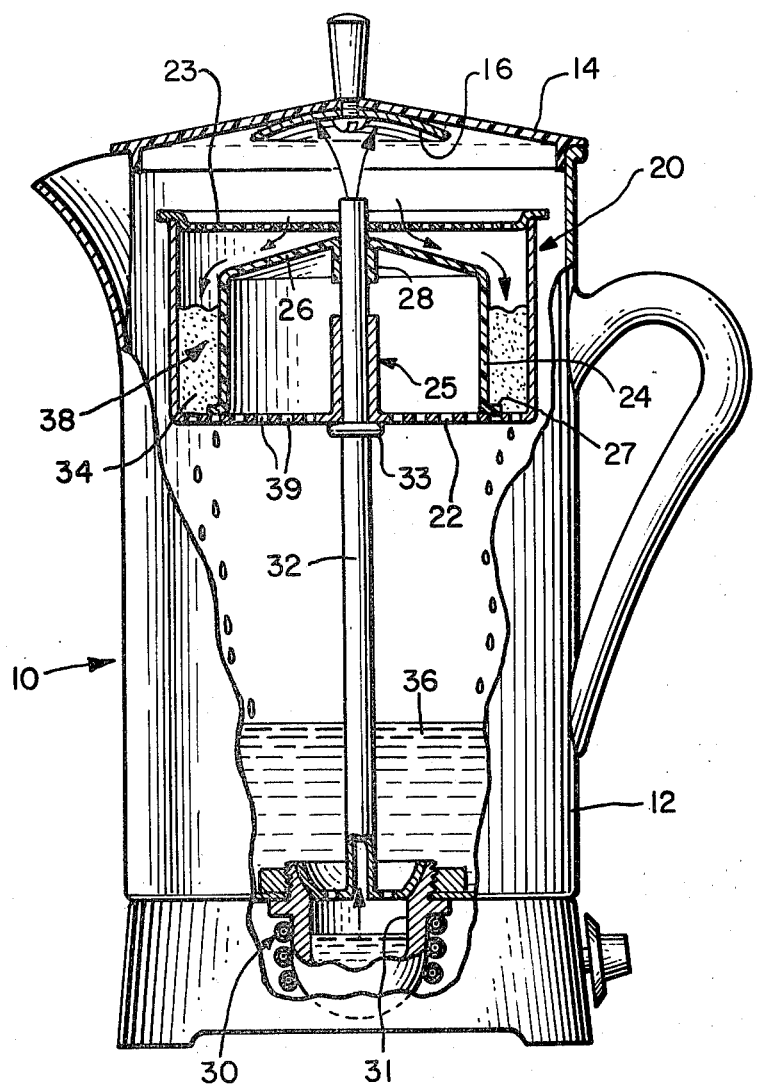
FIG. 1 is a partially sectioned side view of a coffee percolator having a coffee grounds receptacle in which there is located a removable insert according to the present invention.

Referring now to the drawings, and more particularly to FIG. 1, there is illustrated a coffee percolator indicated generally by reference numeral 10. The coffee percolator 10 includes a container 12 for holding water and coffee liquid 36, a percolator lid 14 adapted to cover the container 12, a coffee grounds receptacle assembly 20 which fits within the liquid container 12, and a heating element 30 located at the base of the percolator for heating water and coffee liquid 36 whereby the liquid rises through a hot liquid tube 32.

The coffee grounds receptacle assembly 20 is designed to hold an amount of ground coffee beans, also known as coffee grounds, through which water is repeatedly percolated to extract the essence of the coffee grounds as coffee liquid. The receptacle assembly 20 includes a coffee grounds receptacle 22, which is substantially cylindrical in shape and provided with a centrally located upwardly extending sleeve 25, adapted to accommodate a hot liquid tube 32. The sleeve 25 positions and stabilizes the coffee grounds receptacle 22 on the hot liquid tube 32 while the receptacle 22 rests on a ring 33 on the tube 32. The coffee grounds receptacle 22 is filled with a desired quantity of coffee grounds which corresponds to the amount of water placed within the liquid container 12 to produce a predetermined number of cups of coffee by percolation.

It can be seen that varying the amount of coffee grounds within the receptacle 22 will vary the height of the coffee grounds. Without an insert 24, the grounds are at a level near the top of the receptacle 22 only when the amount of grounds is at or near the capacity of the receptacle 22.

Figure 2:
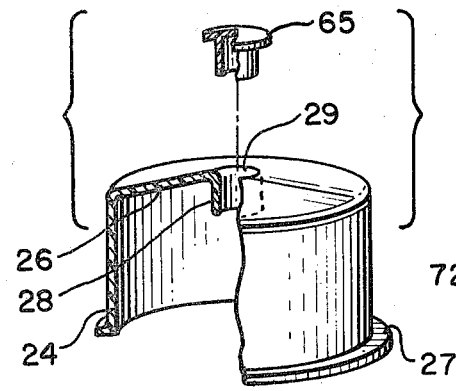
FIG. 2 is a partially sectioned side perspective view of a removable insert according to the present invention for a coffee percolator including a plug so that the insert can be adapted to be used in a drip-type coffee maker.

According to the present invention, as illustrated in FIGS. 1 and 2, there is included within the coffee grounds receptacle assembly 20 a centrally located cylindrical removable insert 24 which confines coffee grounds 34 within a substantially annular area 38 within the receptacle 22. The annular area 38 is defined between the insert 24 and an outer wall of the receptacle. The insert 24 has a substantially frustoconical upper surface 26 which directs liquid from a position above and substantially centrally with respect to the coffee grounds 34 downwardly into the annular area 38.

The insert 24 is used to prepare a desired amount of coffee liquid with less than the amount of coffee grounds typically used in the prior art while maintaining a suitable strength and flavor of the coffee liquid. The insert 24 is provided with a centrally located sleeve 28 which extends downwardly approximately one-fifth the height of the insert 24, and accommodates the hot liquid tube 32 within an aperture 29 to position the insert 24 on the tube 32. Stability of the insert 24 and adequate confinement of the coffee grounds 34 within the annular area 38 are partially provided by a lip 27 around the periphery of the insert 24. The dimensions of the insert 24 can be changed so that the insert will fit specifically within a particular brand or model of percolator, or may be more generally designed to fit within a broad range of percolator models.

As illustrated in FIG. 2, a plug 65 is provided according to the present invention so that the removable insert 24 can be adapted to be used with a coffee maker which does not include a tube for carrying rising hot liquid to an area above the coffee grounds. Such a coffee maker is typically referred to as a drip-type coffee maker, in which hot liquid is directed downwardly through the coffee grounds from a position above and substantially centrally with respect to the coffee grounds, and it is intended that the liquid pass through the coffee grounds only once, during which the desired amount of coffee essence is removed from the coffee grounds. This plug 65 is inserted within the aperture 29 to prevent liquid from entering the aperture 29 and to provide an upper surface which is substantially conical and directs hot liquid into the annular area 38.

Because the receptacle 22 is provided with a perforated lid 23, it is desirable that the insert 24 does not interfere with the seating of the lid 23, and therefore the insert 24 preferably does not contact the lid 23 when the percolator 10 is in operation. However, the height of the insert need not be made so small as to substantially diminish the potential depth of coffee grounds 34 which can be placed in the annular area 38 between the insert 24 and the outer wall of the coffee grounds receptacle 22. The radial dimension of the insert 24 is chosen so that the cross-sectional area and therefore the volume of the coffee receptacle 22 available for coffee grounds is diminished preferably between twenty to forty or fifty percent.

As is known in the art, a coffee grounds receptacle is generally filled with coffee grounds to a pre-selected level which varies with the quantity of coffee liquid to be produced. The level indicates a quantity of coffee grounds which is suitable for making a certain number of cups of coffee at a desired strength and flavor. Typically, one tablespoon of coffee grounds is used for each cup of coffee liquid. According to the present invention, the annular area 38 of the coffee grounds receptacle 24 is filled to approximately the pre-selected level for the quantity of coffee liquid desired, and preferably to at least the pre-selected level or greater. However, the reduction in volume by confining coffee grounds in the annular area 38 permits the use of between twenty to fifty percent fewer coffee grounds than in the prior art, depending upon the strength of the coffee liquid desired, without noticeably affecting the flavor of the coffee produced. For example, for use with a percolator basket having a height of approximately 2½ inches and an outside diameter of approximately 3¾ inches, the insert 24 preferably has a height of approximately 2¼ inches and an outside diameter of approximately 2½ inches. In practice, the apparatus of the present invention according to the above dimensions permits between three and four tablespoons of coffee grounds to be used for making six cups of coffee liquid whereas approximately six tablespoons were used in the prior art.

It will be appreciated that the apparatus of the present invention is constructed after taking into account the method of operation of a typical percolator 10. A brief discussion of the remaining components of the percolator 10 and the method of operation of the device follows. As illustrated in FIG. 1, the liquid container 12 of the percolator 10 is initially provided with an amount of water 36 which corresponds to the number of cups of coffee desired to be made by the percolator. The coffee grounds receptacle assembly 20, including the insert 24, is positioned within the percolator 10 so that the bottom end of the hot liquid tube 32 rests above a thermostatic heating element 30. With the receptacle lid 23 removed, an amount of coffee grounds 34 is placed within the annular area 38. The receptacle lid 23 fits on the receptacle 22 and the percolator lid 14 is accommodated on the percolator container 12.

Upon energizing the thermostatic heating element 30, liquid which has flowed into the heating cup 31 is heated to a point sufficient to cause it to rise through the hot liquid tube 32 to an area above the coffee grounds 34. The liquid is typically expelled from the hot liquid tube 32 with such force that it impacts and rebounds from a dome 16 within the container lid 14. The dome 16 spreads the liquid over a circular area extending radially from the hot liquid tube; this circular area is typically less than the total cross-sectional area of the receptacle 22. A perforated receptacle lid 23 is generally employed to spread the liquid more fully over the cross-sectional area of the receptacle 22.

According to the present invention, all the liquid which passes above the coffee grounds after rebounding from the dome 16 is directed toward the annular area 38, particularly because of the slope of the upper surface 26 of the insert 24. After the water is directed to the annular area 38, it percolates through the coffee grounds 34 to extract some of their essence, and exits the coffee grounds receptacle 22 through perforations. The water is repeatedly cycled through the hot liquid tube 32 to percolate through the coffee grounds 34 until it has acquired the desired coffee liquid consistency and strength.

In a typical percolator including an electrically controlled thermostatic heating element 30, a thermostatic timing means is used to determine when coffee liquid of a desired strength has been obtained. Because it is undesirable to boil coffee liquid, other than for the transient period which causes movement of the liquid through a hot liquid tube 32, a thermosensor determines when the coffee liquid has reached the temperature at which it is probable that the strength of the coffee is at a desired level. Because water inserted into a percolator at a given temperature will be raised to a second temperature after coming in contact with the percolating heating element 30 a predetermined number of times, it is desirable that the maximum amount of hot water contact a maximum amount of coffee grounds within the time period required for elevating the temperature of the amount of water in the container 12 to the desired level at which energization of the heating element 30 is removed and percolation ceases. To this end, it is important to stack the coffee grounds to a desirable level which assures maximum utilization of coffee grounds during the percolation period. Therefore, in order to insure that the coffee produced has the desired flavor and strength, the height of the coffee grounds in a basket should be increased over the level which would result if the smaller amount of coffee grounds were placed in a coffee basket without the apparatus of the present invention. According to the present invention, this desirable height of coffee grounds is at least the same as found suitable when making a similar amount of coffee in the prior art apparatus without the present invention. Furthermore, percolator efficiency is improved because the coffee liquid which passes through the hot liquid tube 32 is directed toward the coffee grounds 34 for percolation.

Figure 3:
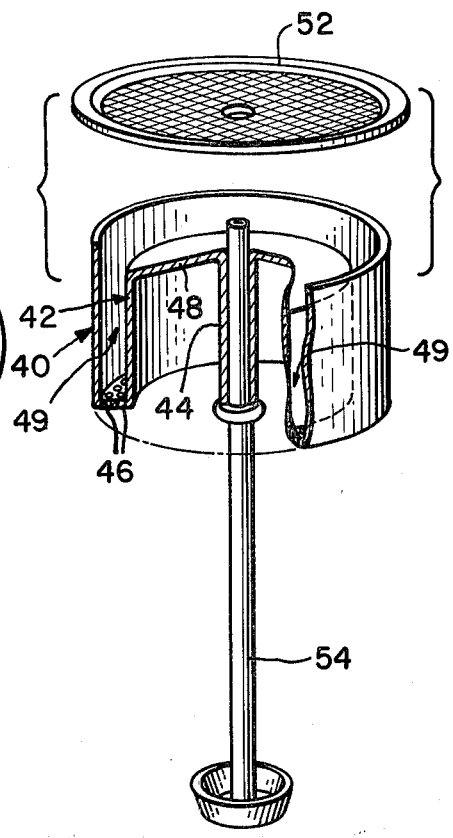
FIG. 3 is a partially sectioned side perspective view of a coffee grounds receptacle according to the present invention used with a hot liquid tube and a receptacle lid for a coffee percolator.

Referring now to FIG. 3, there is illustrated a further embodiment of the apparatus of the present invention in the form of an annular coffee grounds receptacle indicated generally by reference numeral 40. This receptacle 40 includes an inner spacer 42 which corresponds substantially in general construction and function to the removable insert 24 of FIG. 1. However, this embodiment is a unitary receptacle with a spacer 42 therein to insure that the dimensions of an annular area 49 between the inner spacer 42 and the outer wall of the receptacle 40 are maintained throughout the operation of a percolator in which the receptacle 40 is positioned.

The inner spacer 42 is in the form of an inverted, cup-shaped element, and is provided with a frusto-conical upper surface 48 which directs liquid towards the annular area 49. The annular area 49 is defined between the spacer 42 and an outer wall of the receptacle 40. In this preferred embodiment and the other preferred embodiment of the present invention including an insert 24, the upper surface 48 and the upper surface 26 are frustoconical in shape to provide ease of manufacture of the insert, and are inclined at an angle of approximately 10 degrees from the horizontal. However, water or liquid may be directed toward the annular area 38 by any suitable means, such as an arcuately convex configuration of the upper surface 26.

A sleeve 44 attached to the inner spacer 42 defines an aperture which accommodates a hot liquid tube 54 and positions the spacer 42 on the tube and centrally within the percolator. The receptacle 40 also includes a lid 52 for positioning thereon. In the operation of a percolator using the receptacle 40 according to the present invention, hot liquid is repeatedly cycled through the hot liquid tube 54 and expelled from the top of the tube 54 to rebound from a percolator dome (not shown) and is spread over a lid 52 and directed toward the annular area 49 by the upper surface 48 of the spacer 42. The liquid percolates through the coffee grounds (not shown) and exits through perforations 46 in the lower surface of the annular coffee grounds receptacle 40.

A further embodiment of the apparatus of this invention is adapted to be used with a drip-type coffee maker. The coffee grounds receptacle assembly of such a coffee maker is illustrated in cross-sectional view in FIG. 4 and indicated generally by reference numeral 60. In this embodiment, a removable substantially cylindrical insert 62 having a conical upper surface 64 is inserted within an open cylindrical coffee grounds receptacle 72 of the drip-type coffee maker. The upper surface 64 is preferably conical for ease of manufacture and inclined at an angle of about 10 degrees from the horizontal, although it may alternatively be arcuately convex or any suitable configuration which directs water toward the annular area 76. A filter paper 68 is preferably provided with a centrally located cross slit so that the filter paper can be positioned within the annular area 76 by being drawn down over the insert 62. The filter paper 68 slows the rate of percolation of liquid through coffee grounds 66 which have been placed in an annular area 76 defined between the insert 62 and the outer wall of the coffee grounds receptacle 72. In the operation of the drip-type coffee maker, water descends upon the conical upper surface 64 from a position above and substantially centrally with respect to the coffee grounds, preferably conical for ease of manufacture and inclined at an angle of about 10 degrees from the horizontal, although it may alternatively be arcuately convex or any suitable configuration which directs water toward the annular area 76. A filter paper 68 is preferably provided with a centrally located cross slit so that the filter paper can be positioned within the annular area 76 by being drawn down over the insert 62. The filter paper 68 slows the rate of percolation of liquid through coffee grounds 66 which have been placed in an annular area 76 defined between the insert 62 and the outer wall of the coffee grounds receptacle 72. In the operation of the drip-type coffee maker, water descends upon the conical upper surface 64 from a position above and substantially centrally with respect to the coffee grounds, and is directed towards the annular area 76 to percolate through the coffee grounds 66 at exit through the filter paper 68 to perforations 74 in the receptacle 72.

Figure 4:
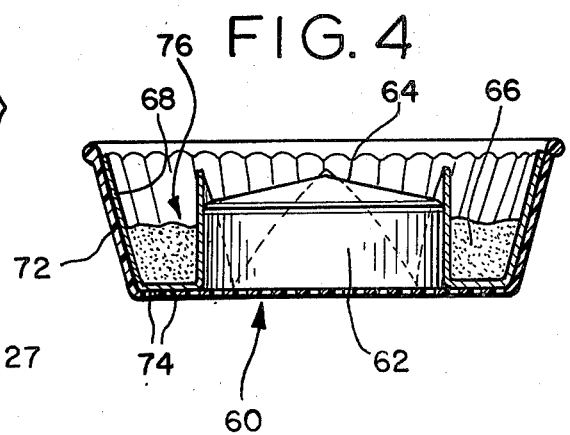
FIG. 4 is a side cross-sectional view of a coffee grounds receptacle having a removable insert according to the present invention for use in a drip type coffee maker.

The dimensions of these embodiments of the apparatus of the present invention are chosen in the same general fashion as those of the insert 24 illustrated in FIGS. 1 and 2. In other words, the radial dimension of the spacer 42, shown in FIG. 3, and the insert 62, shown in FIG. 4, are chosen so that the volume available for retaining coffee grounds is reduced by twenty to forty or fifty percent, depending upon the desired strength and flavor of the coffee. Furthermore, according to the method of the present invention, between twenty to forty or fifty percent fewer coffee grounds are used to make coffee in a coffee maker in which hot water is directed downwardly through the coffee grounds from a position above the coffee grounds. The coffee grounds are confined in a substantially annular area and arranged with approximately the same depth as when a known coffee grounds receptacle is filled to a preselected level for making a quantity of coffee liquid of a given strength and flavor.

Though the embodiments hereinbefore described are preferred, many modifications and refinements which do not depart from the true spirit and scope of the invention may be conceived by those skilled in the art. It is intended that all such modifications be covered by the following claims.

I claim:

1. An apparatus for improving coffee grounds usage comprising:

a coffee grounds receptacle having an outer wall and an inner spacer means for confining coffee grounds to an annular area between said inner spacer means and said outer wall of the receptacle, said inner spacer means having a frustoconical upper surface provided with an aperture adapted to accommodate a tube for rising hot liquid; and a plug for said aperture so that said receptacle is adapted to be used in a drip-type coffee maker.

2. The apparatus of claim 1 wherein the frustoconical upper surface is provided with a downwardly extending sleeve to accommodate the hot liquid tube and position the receptacle on the tube.

3. In a coffee percolator having a coffee grounds receptacle and a tube positioned within the receptacle for conveying rising hot liquid to an area above the coffee grounds, an apparatus for improving coffee grounds usage comprising:

removable insert means for confining coffee grounds within a substantially annular area between said insert and an exterior wall of the receptacle, said insert means having a frustoconical upper surface provided with an aperture to accommodate the hot liquid tube, whereby rising hot liquid expelled from the tube is directed downwardly into the annular area containing the coffee grounds; and a plug for said aperture so that said removable insert means is adapted to be used in a drip-type coffee maker.

4. An apparatus for improving coffee grounds usage in a coffee grounds receptacle for a coffee maker comprising:

removable insert means for confining coffee grounds within a substantially annular area between said insert and a wall of said receptacle, said insert means having a frustoconical upper surface provided with an aperture means for accommodating a tube conveying rising hot liquid to an area above the coffee grounds; and a plug for said aperture means so that said removable insert means is adapted to be used in a drip-type coffee maker.

5. The apparatus of claim 4, wherein said removable insert means is provided with a lip around the lower periphery of the insert means.

* * * * *